United States Patent [19]

Trunk

[11] Patent Number: 5,685,338
[45] Date of Patent: Nov. 11, 1997

[54] SHUT-OFF DEVICE

[75] Inventor: Werner Trunk, Hedetoften, Denmark

[73] Assignee: Brdr. Christensens-Haner A/S, Haslev, Denmark

[21] Appl. No.: 634,474

[22] Filed: Apr. 18, 1996

[30] Foreign Application Priority Data

Apr. 27, 1995 [DK] Denmark .................................. 0502/95

[51] Int. Cl.⁶ ...................................................... F16K 5/08
[52] U.S. Cl. ...................... 137/613; 137/625.32; 251/309
[58] Field of Search ............................. 137/613, 625.32, 137/860; 251/304, 309, 312, 310

[56] References Cited

U.S. PATENT DOCUMENTS

| 611,899 | 10/1898 | Freeman | 137/625.32 |
|---|---|---|---|
| 911,546 | 2/1909 | Shields | 137/625.32 |
| 1,130,399 | 3/1915 | Gustafson | 137/625.32 |
| 2,045,113 | 6/1936 | Ward | 251/312 X |
| 3,101,191 | 8/1963 | Wolfensperger | 251/309 |
| 4,658,847 | 4/1987 | McCrone | 251/316 X |
| 4,846,212 | 7/1989 | Scobie et al. | 137/613 X |
| 5,312,086 | 5/1994 | Hollingworth | 251/309 |

FOREIGN PATENT DOCUMENTS

| 565243 | 10/1993 | European Pat. Off. . |
|---|---|---|
| 918020 | 2/1963 | United Kingdom . |
| 1541269 | 2/1979 | United Kingdom . |
| 8400795 | 3/1984 | WIPO . |

*Primary Examiner*—Kevin Lee
*Attorney, Agent, or Firm*—Donald S. Dowden

[57] ABSTRACT

A shut-off device, such as a valve or a cock, for pipelines and comprising a casing provided with a flow passageway. The casing is provided with an inlet and an outlet and at least one shut-off member provided with a cavity, the member being movable between a position in which the flow passageway is open and a position in which the flow passageway is closed. An auxiliary chamber is arranged in the casing and communicates with the cavity of the shut-off member. The auxiliary chamber is defined by a separate, almost non-resilient wall portion abutting an abutment face on the wall of the casing. A pressure-relieving passageway formed in the wall of the casing is arranged between an abutment face at the auxiliary chamber and the inlet or outlet of the shut-off device. As a result, a shut-off device having more simple structure than known shut-off devices is obtained.

9 Claims, 2 Drawing Sheets

5,685,338

SHUT-OFF DEVICE

BACKGROUND FOR THE INVENTION

1. Field of the Invention

The invention relates to a shut-off device, such as a valve or a cock, for pipelines and comprising a casing provided with a flow passageway, where the casing has an inlet and an outlet, and at least one shut-off member provided with a cavity and movable between a position in which the flow passageway is open and a position in which the flow passageway is closed, and where an auxiliary chamber associated with the shut-off member is arranged in the casing and communicating with the cavity of the shut-off member, sealing means being provided between the shut-off member and the casing.

2. Background Art

A ball valve is known allowing for relief of possible excess pressure occurring in the flow medium in the cavity of the valve ball and in a second cavity associated therewith, if the excess pressure is unusually high, e.g. as a result of a fire, even though the valve ball seals firmly on the downstream side. The pressure is relieved on the upstream side through pressure-relieving passageways formed in a pair of sealing rings between the valve ball and the valve casing. This ball valve is fairly complex. After prolonged normal use of the valve, undesired leaks may easily occur in the sealing rings. Moreover, the ball valve is quite unfit for use, if it is required that the shut-off member abuts the casing metal to metal.

SUMMARY OF THE INVENTION

The object of the invention is to provide a shut-off device of the above type and which in terms of structure is more simple than the known shut-off devices.

In satisfaction of the above object there is provided by the present invention a shut-off device, wherein the auxiliary chamber is defined by a separate, almost non-resilient wall portion abutting an abutment face on the wall of the casing, a pressure-relieving passageway formed in the wall of the casing being provided between the abutment face and the inlet or outlet of the shut-off device respectively. As a result, the excess pressure occurring at very high temperatures, e.g. as a result of a fire, in the cavity of the shut-off member (when the shut-off device is closed) is balanced in a more simple manner than previously known, as the resilient wall portion abutting an abutment face on the wall of the casing yields under these conditions, thus ensuring free passage between the auxiliary chamber and the pressure-relieving passageway. Particular sealing means between the shut-off member and the casing are completely superfluous.

According to the invention, the separate resilient wall portion may be formed as a bottom part bolted on the casing and one or more sealing means, preferably in form of steel plates, a graphite ring or the like, may be inserted between the bottom part and the abutment face. Consequently, under normal pressure and temperature conditions, the pressure-relieving passageway remains tightly closed in a reliable manner; however, the passageway may be opened in an emergency.

Moreover, a sealing ring of an essentially C-shaped cross section may be inserted into a circumferential groove associated with the abutment face. As a result a good sealing capacity at high pressure is obtained.

According to the invention, the auxiliary chamber may advantageously communicate with the cavity of the shut-off member via a passageway.

An embodiment of the shut-off device according to the invention where the valve is of the double block-and-bleed type and thus comprises two shut-off members is characterised in that a pressure-relieving passageway is provided between the abutment face in a first auxiliary chamber of the first shut-off member and the inlet of the shut-off device, and/or a second pressure-relieving passageway is provided between the abutment face in a second auxiliary chamber and the outlet of the shut-off device. This embodiment has proved particularly reliable.

Finally, according to the invention, the pressure-relieving passageway may be formed of a bore in the wall of the casing, whereby the pressure-relieving passageway is provided in a particularly simple manner, thus making the manufacture of the shut-off device more economical.

BRIEF DESCRIPTION OF THE DRAWINGS

The invention is explained in detail below with reference to the drawings, in which.

DETAILED DESCRIPTION OF PREFERRED EMBODIMENTS

Figure 1:
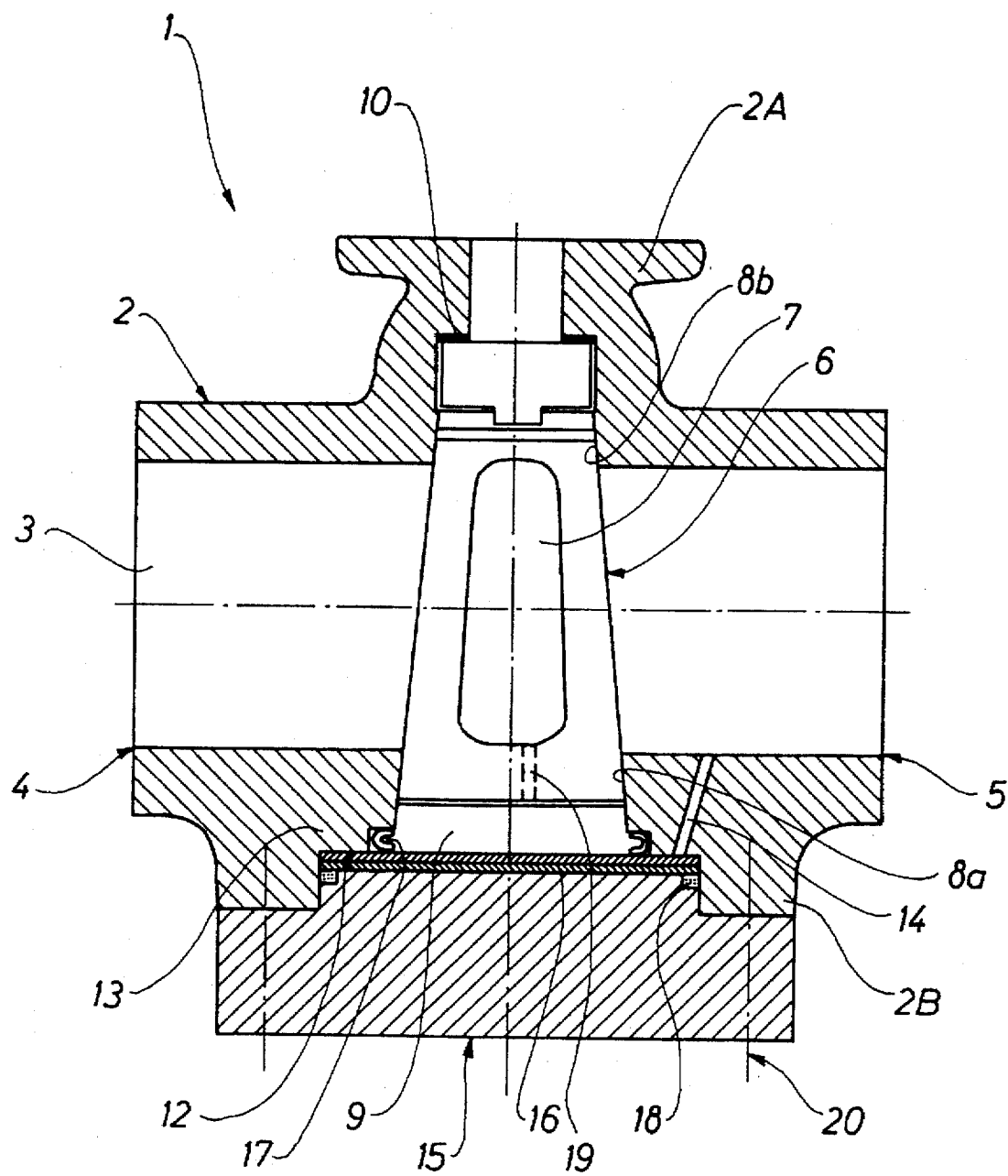
FIG. 1 is a cross-sectional view of a first embodiment of the shut-off device according to the invention, the shut-off member being shown in a non-sectional view.

The shut-off device 1 shown in FIG. 1 comprises a casing 2 provided with a flow passageway 3. The flow passageway is provided with an inlet 4 on the left-hand side and an outlet 5 on the right-hand side.

A conical recess 8a is formed in the lower part 2B of the casing 2, and a conical recess 8b is formed in the upper part 2A of the casing. A conical shut-off member 6 is arranged in both recesses transversely of the flow direction, and at the recess 8b in the upper part 2A of the casing a projection is arranged and adapted to receive the uppermost and narrowest ends of the shut-off member 6. The conical shut-off member 6 (plug member) has a through-going cavity and can be moved between a position in which the flow passageway 3 is open and a position in which the flow passageway 3 is closed.

In the lower part 2B of the casing below the shut-off member 6, an auxiliary chamber 9 is arranged into which the flow medium present in the cavity 7 of the shut-off member 6 may flow via a passageway 19. The auxiliary chamber is defined by the casing 2, the shut-off member 6 and a separate, almost non-resilient wall portion, e.g. in form of a bottom cover 15 secured to the lower part 2B of the casing by means of bolts 20. The bottom cover abuts an abutment face 12 on the wall 13 of the casing. A pressure-relieving passageway 14 is formed in the wall 13 of the casing between the abutment face and the outlet 5 of the shut-off device; optionally, the pressure-relieving passageway can be arranged between the abutment face 12 (the auxiliary chamber 9) and the inlet 4.

Furthermore, sealing means 10 are provided between the shut-off member 6 and the casing 2.

Figure 2:
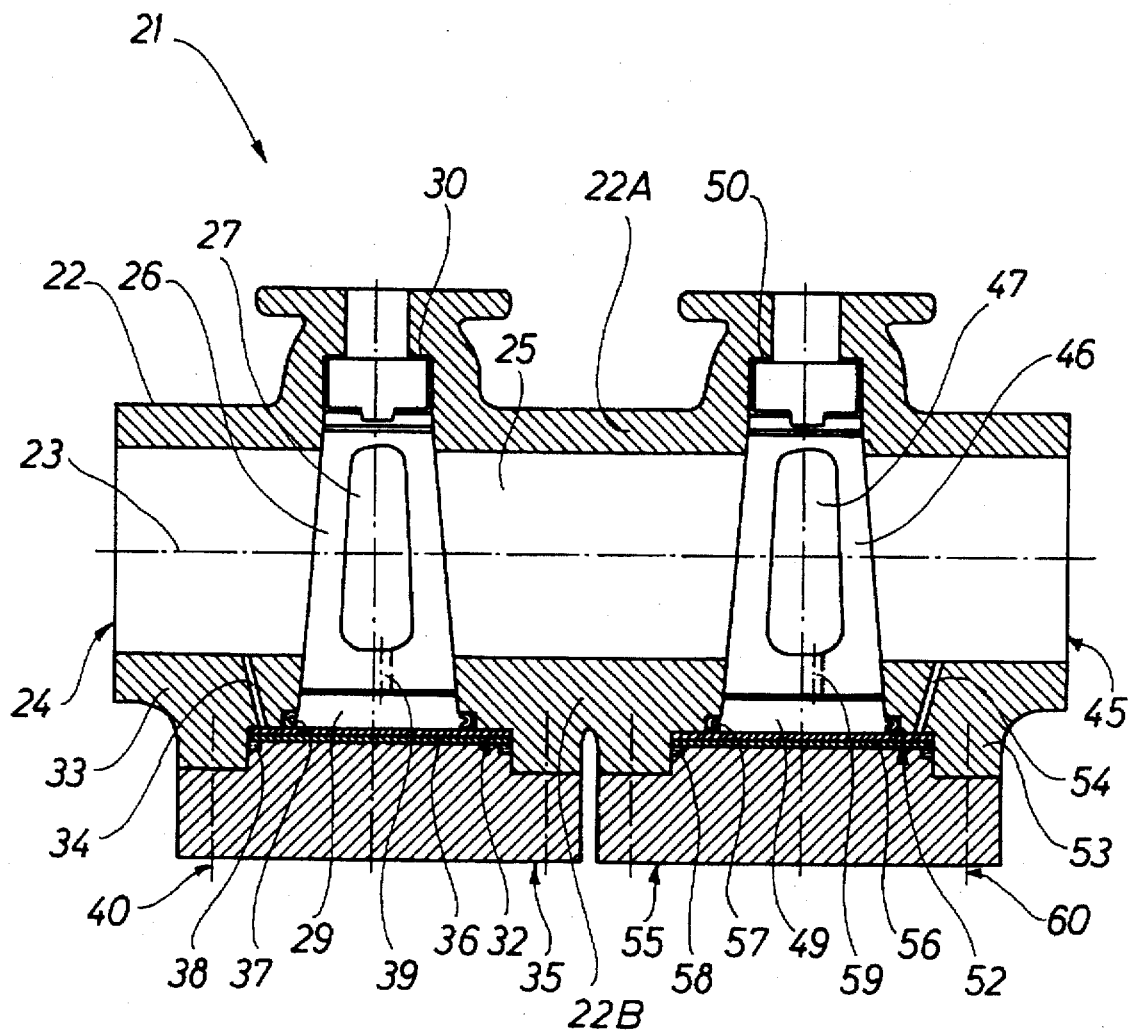
FIG. 2 is a sectional view of a second embodiment of the shut-off device according to the invention, the shut-off members being shown in a non-sectional view.

The shut-off device 21 shown in FIG. 2 is of the double block-and-bleed type and comprises a casing 22 provided with a flow passageway 23. The casing has an inlet 24, an intermediate part 25 and an outlet 45.

Two slightly conical recesses are formed in the casing 22 for insertion of two conical shut-off members 26, 46 transversely of the flow direction and two projections provided with bores are arranged at the recesses in the bottom part to receive the uppermost and narrowest ends of the two conical shut-off members 26,46. Both shut-off members 26,46 are hollow, each having a through-going cavity 27,47. Each of the shut-off members can be moved between a position in which the flow passageway 23 is open and a position in which the flow passageway 23 is closed.

For closure of the two recesses in the lower portion 22B of the casing two almost non-resilient bottom covers 35,55 are secured by means of bolts 40,60. The bottom covers 35 and 55 abut each their own abutment face 32,52 respectively, formed on the casing.

In association with and below the first shut-off member 26, an auxiliary chamber 29 defined by the wall 33 of the casing, the bottom cover 35 and the shut-off member 26 is arranged and communicating with the cavity 27 of the shut-off member 26 through a passageway 39. In association with the second shut-off member 46, a second auxiliary chamber 49 defined by the wall 53 of the casing, the bottom cover 55 and the shut-off member 46 is arranged and communicating with the cavity 47 of the second shut-off member 46 via a second passageway.

A pressure-relieving passageway 34 is provided at the first shut-off member 26 between the abutment face 32 and the inlet 24 of the shut-off device, and a second pressure-relieving passageway 54 is provided at the second shut-off member 46 between the abutment face 52 and the outlet 45 of the shut-off device.

As shown in FIG. 2, one or more sealing means 36,56 (e.g. steel plates and/or graphite rings) can be inserted in the same manner as shown in FIG. 1 between the covers 35,55 and the abutment faces 32,52, and furthermore, a sealing ring 37,57 of an essentially C-shaped cross-section can be inserted into a circumferential groove associated with the abutment faces 32,52.

Moreover, sealing rings 30,50 can be arranged between the upper ends of the two shut-off members 26,46 and the casing 22.

The valve operates in the following manner: At very high temperatures, e.g. as a result of a fire, the pressure in the cavity 27,47 of the two shut-off members 26,46 of the double block-and-bleed valve and in the two auxiliary chambers 29,49 increases dramatically. For safety reasons, the high pressure need be relieved from the cavities to prevent accidents, e.g. the shut-off member cracks or the bolts for the bottom covers break. For environmental reasons, the pressure relief operation is carried out such that the medium is re-fed into the flow passage. Jointly with the almost non-resilient bottom covers 35,55, the pressure-relieving passageways 34,54 ensure that the excess pressure arising in emergencies in the cavities 27,46 and in the auxiliary chambers 29,49 is reliably fed back to the inlet 24 and the outlet 45 respectively, of the double block-and-bleed valve. For removal of any leaked flow medium, when the shut-off member is in its closed position, a bleed valve (not shown) or simply a drain pipe is provided in the intermediate part 25 of the flow passageway and communicating directly with the surroundings outside the shut-off device.

The invention may be modified in many ways without thereby deviating from scope of the invention.

I claim:

1. A shut-off device for pipelines and comprising a casing provided with an abutment face and a flow passageway wherein the casing has an inlet and an outlet and at least one shut-off member provided with a through-going cavity and movable between a position in which the flow passageway is open and a position in which the flow passageway is closed, and wherein an auxiliary chamber is arranged in the casing and communicating with the cavity of the shut-off member, sealing means being provided between the shut-off member and the casing, wherein the auxiliary chamber is defined by a separate, substantially non-resilient wall portion abutting said abutment face, a pressure-relieving passageway being formed in the casing between the abutment face and the inlet or outlet of the shut-off device.

2. A shut-off device according to claim 1 wherein the separate, substantially non-resilient wall portion is formed of a bottom part bolted on the casing, and at least one sealing means, is arranged between the bottom part and the abutment face.

3. A shut-off device according to claim 1 wherein a sealing ring of an essentially C-shaped cross section is inserted into a circumferential groove associated with the abutment face.

4. A shut-off device according to claim 1 wherein the auxiliary chamber communicates with the cavity of the shut-off member via a passageway.

5. A shut-off device according to claim 1 and of the double block-and-bleed type, thus comprising first and second shut-off members, wherein a first pressure-relieving passageway is provided between the abutment face in a first auxiliary chamber of the first shut-off member and the inlet of the shut-off device.

6. A shut-off device according to claim 1 wherein the pressure-relieving passageway is formed by a bore in the casing.

7. A shut-off device according to claim 2 wherein the sealing means is formed of steel.

8. A shut-off device according to claim 2 wherein the sealing means is formed of graphite.

9. A shut-off device according to claim 1 and of the double block-and-bleed type, thus comprising first and second shut-off members, wherein a second pressure-relieving passageway is provided between the abutment face in a second auxiliary chamber of the second shut-off member and the outlet of the shut-off device.

\* \* \* \* \*